United States Patent [19]

Baba

[11] Patent Number: 4,922,444

[45] Date of Patent: May 1, 1990

[54] APPARATUS FOR DETERMINING DISTANCE COORDINATES

[75] Inventor: Mitsuru Baba, Hamamatsu, Japan

[73] Assignee: Yamaha Corporation, Hamamatsu, Japan

[21] Appl. No.: 132,012

[22] Filed: Dec. 14, 1987

[30] Foreign Application Priority Data

Dec. 16, 1986 [JP] Japan .................................. 61-299609

[51] Int. Cl.⁵ ...................... G01P 15/12; G09G 3/02
[52] U.S. Cl. .................................. 364/566; 364/449;
73/493; 73/510; 73/517 B; 178/20; 340/710
[58] Field of Search ........... 364/565, 566, 449, 709.11;
324/174, 207, 208; 178/18–20; 340/709, 710;
73/493, 505, 510, 517 B

[56] References Cited

U.S. PATENT DOCUMENTS

| | | | |
|---|---|---|---|
| 3,877,313 | 4/1975 | Ferriss | 73/517 B X |
| 4,094,199 | 6/1978 | Holdren et al. | 364/566 X |
| 4,102,202 | 7/1978 | Ferriss | 364/566 X |
| 4,495,464 | 1/1985 | Kozai et al. | 324/174 |
| 4,544,803 | 10/1985 | Schaller | 178/18 |
| 4,581,761 | 4/1986 | Ichinokawa et al. | 340/710 X |
| 4,613,853 | 9/1986 | Hosogoe et al. | 340/710 |
| 4,626,621 | 12/1986 | Hiyama et al. | 178/18 |
| 4,627,011 | 12/1986 | Spencer et al. | 364/566 |
| 4,634,973 | 1/1987 | Murakami et al. | 178/18 X |
| 4,661,773 | 4/1987 | Kawakita et al. | 328/208 |
| 4,665,361 | 5/1987 | Dorsch et al. | 324/207 |
| 4,732,494 | 3/1988 | Guers et al. | 324/208 X |
| 4,734,685 | 3/1988 | Watanabe | 340/710 |
| 4,758,959 | 7/1988 | Thoone et al. | 364/449 X |
| 4,763,116 | 8/1988 | Eichholz | 340/710 |
| 4,779,075 | 10/1988 | Zägelein et al. | 324/207 X |
| 4,787,051 | 11/1988 | Olson | 364/518 |

Primary Examiner—Parshotam S. Lall
Assistant Examiner—Joseph L. Dixon
Attorney, Agent, or Firm—Scully, Scott, Murphy & Presser

[57] ABSTRACT

The apparatus for determining coordinates is used as a pointing device or a mouse device in a personal computer system. The present apparatus comprises plural speed sensors and an operating means such as a CPU. When the speed sensors are moved by an operator, each of the speed sensors detects each of accelerations thereof in predetermined axis directions. The detected accelerations of the speed sensors are converted into moving distances representative of the coordinates through a calculation of the operating means. By only holding and moving the present apparatus by an operator, it is possible to input the coordinates with ease and with accuracy because there is no need to provide a heavy metal ball of the conventional mechanical mouse device and a transparent board of the conventional optical mouse device.

2 Claims, 3 Drawing Sheets

APPARATUS FOR DETERMINING DISTANCE COORDINATES

BACKGROUND OF THE INVENTION

1. Field of the Invention

The present invention generally relates to an apparatus for inputting coordinates, and more particularly to an apparatus for inputting desirable coordinates representative of a position of a cursor on a screen of a display unit provided in a personal computer system, for example.

2. Prior Art

Conventionally, a mouse device is well known as the apparatus for inputting coordinates (such as a pointing device) for use in a personal computer system. Such mouse device can be classified as a mechanical mouse device or an optical mouse device.

FIG. 1 is a diagrammatic view showing a mechanical constitution of the conventional mechanical mouse device surrounded by an X-axis and a Y-axis. In FIG. 1, 1 designates an X roller and 2 designates a Y roller. These rollers 1 and 2 are arranged by forming a right angle between axis directions of the rollers 1 and 2. In addition, 3 designates a dummy roller and 4 designates a metal ball. The metal ball 4 is supported by the rollers 1 to 3 so that the metal ball 4 can revolve freely. Furthermore, 5 and 6 designate increment type rotary encoders. The rotary encoder 5 outputs a pulse signal in response to a revolving distance of the X roller 1, and the rotary encoder 6 outputs a pulse signal in response to a revolving distance of the Y roller 2. Each of these rotary encoders 5 and 6 comprises a disc having a circumference on which a plurality of slits are formed by an equal distance, and a photo-interrupter for detecting the slits. These disc and photo-interrupter (not shown) are stored in a case. This case has a window at a predetermined position on a lower surface thereof, and a certain portion of the metal ball 4 is slightly stuck out of the window of the case.

The above-mentioned mouse device is used by being put on an upper surface of a desk, for example. When an operator of the personal computer system holds and slides such mouse device on the desk, the metal ball 4 must be revolved in accordance with a movement of the mouse device. Due to a revolution of the metal ball 4, the X roller 1 and the Y roller 2 must be revolved. In this case, the rotary encoder 5 outputs a pulse signal corresponding to a moving distance of the mouse device in the X direction. Similarly, the rotary encoder 6 outputs a pulse signal corresponding to a moving distance of the mouse device in the Y direction.

On the contrary, the optical mouse device must use a transparent board (celluloid board) exclusively. Grids having different colors are printed on the celluloid board in longitudinal and horizontal directions. In addition, the optical mouse device has an X-direction photo sensor for detecting colors of the grids only in the horizontal direction (i.e., the X direction) and a Y-direction photo sensor for detecting colors of the grids only in the longitudinal direction (i.e., the Y direction). Each photo sensor consists of a pair of a light emitting element and a light receiving element. The X-direction and Y-direction photo sensors detect numers of the grids in the horizontal and longitudinal directions to thereby detect the moving distance of the optical mouse device in the X and Y directions respectively.

However, the conventional mechanical mouse device described suffers following problems.

(1) The mechanical mouse device must have a heavy weight since the large metal ball 4 is provided therein. Hence, the mouse device will be seriously damaged when the mouse device is dropped.

(2) In the case where a frictional resistance between the metal ball 4 and a plane (e.g., a surface of desk) touching the surface of the metal ball 4 is so small that the metal ball 4 sometimes slips on the plane without revolving, the metal ball 4 does not revolve in response to the moving distance of the mouse device. Hence, it becomes sometimes impossible to input the coordinates to the personal computer system accurately.

(3) Since dust adheres to the metal ball 4 interferes with operation of the mouse device, the metal ball 4 must be cleaned up frequently.

On the other hand, the conventional optical mouse device described suffers following problems.

(a) It is burdensome for the operator to use the celluloid board exclusively used for the optical mouse device.

(b) In case where the dust adheres to the light emitting and receiving planes of the photo sensor, it sometimes becomes impossible to input the coordinates to the personal computer system accurately.

SUMMARY OF THE INVENTION

It is therefore a primary object of the present invention to provide an apparatus for inputting coordinates which can be held and moved by the operator and which can easily input the coordinates without using additional devices such as an exclusive transparent board.

It is another object of the present invention to provide an apparatus for inputting coordinates which can accurately input coordinates without being effected by dust adhered thereto.

In a first aspect of the invention, there is provided an apparatus for inputting coordinates to a computer system comprising: (a) acceleration detecting means for detecting accelerations thereof along directions corresponding to at least two rectangular coordinates; directions and (b) operating means for calculating moving distances along the at least to directions based on detecting results of the speed detecting means.

In a second aspect of the invention, there is provided an apparatus for inputting coordinates to a computer system, the coordinates representing a desirable position of a cursor on a screen of a display unit of the computer system, the apparatus comprising: (a) acceleration detecting means for detecting accelerations thereof along directions corresponding to at least two rectangular coordinates directions based on a predetermined reference plane, the acceleration detecting means outputting acceleration detecting signals representative of detected accelerations along the at least two directions; (b) analog-to-digital converter means for respectively converting the acceleration detecting signals to acceleration detecting data; and (c) operating means for calculating moving distances in the rectangular coordinate directions based on the acceleration detecting data.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DESCRIPTION OF THE PREFERRED EMBODIMENT

Figure 1:
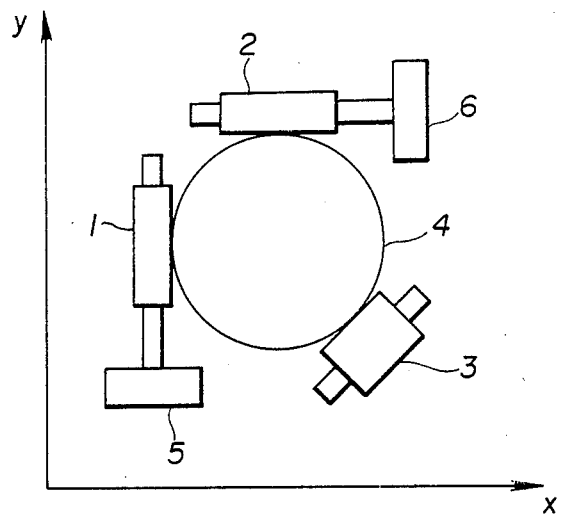
FIG. 1 is a diagrammatic view showing the mechanical constitution of the conventional mechanical mouse device.
Figure 2:
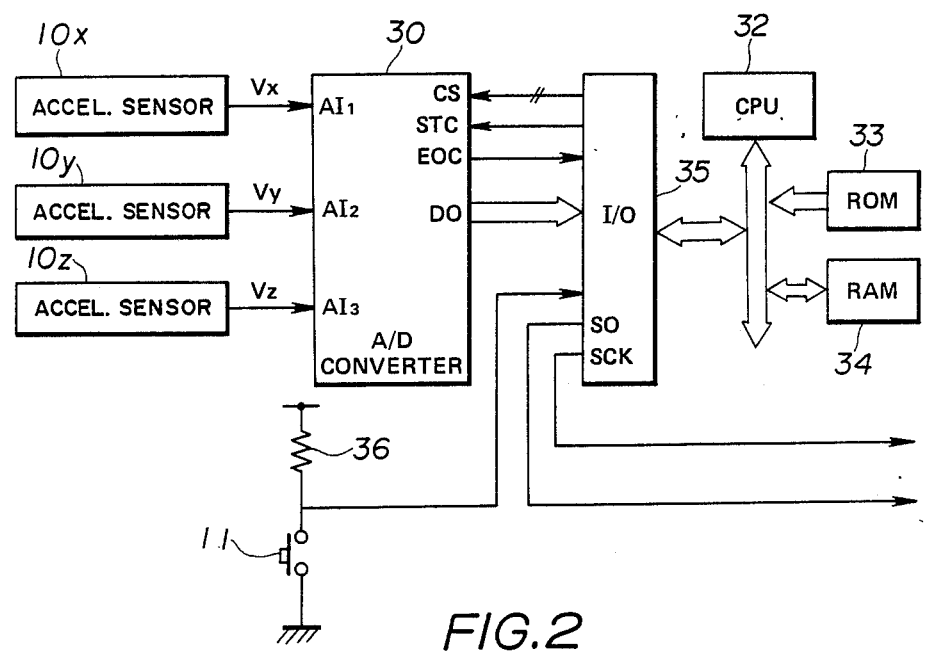
FIG. 2 is a block diagram showing an electrical constitution of an embodiment of an apparatus for inputting coordinates according to the present invention.

Referring now to the drawings, wherein like reference numerals designate like or corresponding parts throughout the several views, FIG. 2 is a block diagram showing the electrical constitution of an embodiment of the apparatus for inputting coordinates according to the present invention.

Figure 3:
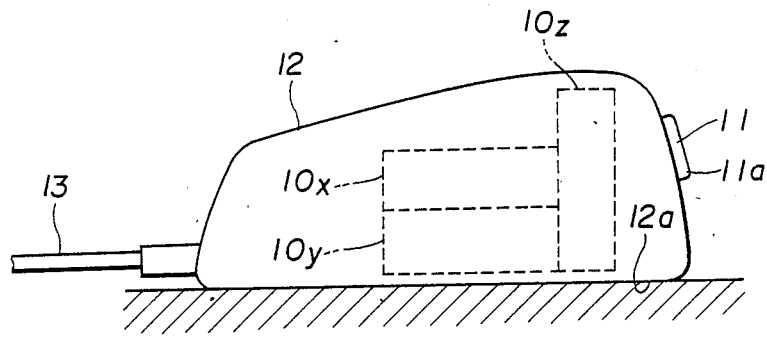
FIG. 3 is a side view showing an appearance of the apparatus shown in FIG. 2.
Figure 4:
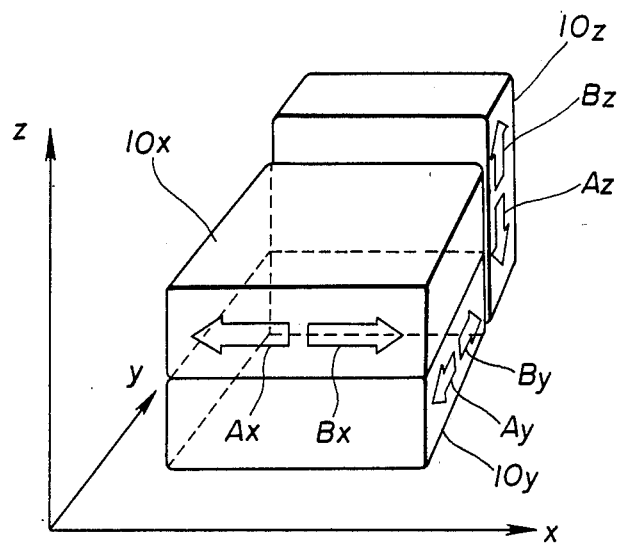
FIG. 4 is a perspective view showing acceleration sensors used in the apparatus shown in FIG. 2.

In FIG. 2, $10x$ designates an X-direction acceleration sensor, $10y$ designates a Y-direction acceleration sensor, $10z$ designates a Z-direction acceleration sensor and 11 designates a push button switch for triggering the present apparatus for inputting coordinates. As shown in FIG. 3, these acceleration sensors $10x$, $10y$ and $10z$ are provided within a case 12, and the push button switch 11 is fixed at a predetermined position of the case 12 such that a push button portion 11a of the push button switch 11 sticks out of a frame of the case 12. In FIG. 3, a cable 13 is connected to a personal computer unit. As shown in FIG. 4, the acceleration sensor $10x$ detects accelerations thereof in directions Ax and Bx, the acceleration sensor $10y$ detects a acceleration thereof in directions Ay and By, and the acceleration sensor $10z$ detects accelerations thereof in directions Az and Bz. In FIG. 4, X, Y and Z axes representative of three dimensional rectangular coordinates are arranged as shown in FIG. 4 based on a bottom plane 12a of the case 12. The directions Ax and Bx are arranged parallel to the X axis, the directions Ay and By are arranged parallel to the Y axis, and the directions Az and Bz are arranged parallel to the Z axis.

Next, description will be given with respect to mechanical constitutions of the acceleration sensors $10x$, $10y$ and $10z$ in conjunction with FIG. 5. In a diagrammatically cube-shaped case 14 shown in FIG. 5, a core 15 attached to an inner plane 14a is arranged opposite to a core 16 attached to an inner plane 14b, and a space SP is formed between the cores 15 and 16. The core 15 is wound by a coil 17 so as to constitute an electromagnet. Similarly, the core 16 is wound by a coil 18 so as to constitute an electromagnet. The winding direction of the coil 17 is set reverse to that of the coil 18. A base edge portion of a plate spring 19 is attached to a center position of an inner plane 14c which lies at right angles to the inner planes 14a and 14b. A permanent magnet 20 is attached to a tip edge portion of the plate spring 19. The south (S) pole of the permanent magnet 20 faces the core 15 and the north (N) pole thereof faces the core 16. Hence, the permanent magnet 20 is supported by the plate spring 19 such that the permanent magnet 20 can freely move in directions A and B. In other words, the permanent magnet 20 can freely move near to or apart from the core 15 (or the core 16). A servo-type amplifier 26 having high accuracy (and using a conductive plastic element, for example) is applied to a linear potentiometer 22 for detecting a displacement (i.e., moving direction and distance) of the permanent magnet 20. This potentiometer 22 has a slider 22a connected to the plate spring 19, and the slider 22a can move in response to a movement of the permanent magnet 20 in the directions A and B.

Figure 6:
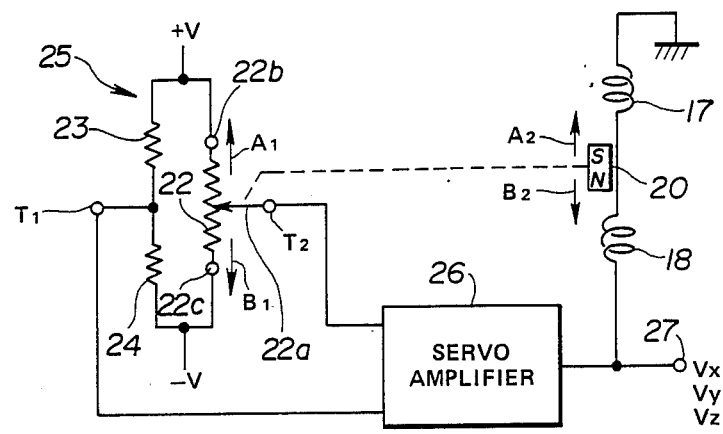
FIG. 6 is a circuit diagram showing an electrical constitution of the acceleration sensor.

Next, description will be given with respect to electric constitutions of the acceleration sensors $10x$, $10y$ and $10z$ in conjunction with FIG. 6. In FIG. 6, the potentiometer 22 represented by a resistor has a terminal 22b connected with one terminal of a resistor 23 and another terminal 22c connected with one terminal of a resistor 24. In addition, other terminals of the resistors 23 and 24 are connected together so as to constitute a resistor bridge circuit 25. Furthermore, voltages, $+V$ and $-V$ are respectively applied to the terminals 22b and 22c, and the resistance of the resistor 23 is set equal to that of the resistor 24. The common terminal connected by the resistors 23 and 24 is connected to a servo amplifier 26 via a terminal $T_1$, and the slider 22a of the potentiometer 22 is also connected to the servo amplifier 26 via a terminal $T_2$. This servo amplifier 26 amplifies a voltage at the terminal $T_2$ based on a reference voltage (equal to 0 volt) at the terminal $T_1$. More specifically, the servo amplifier 26 outputs the voltage of 0 volt when the resistor bridge circuit 25 is subjected to an equilibrium state because the slider 22a is located at a middle point of the potentiometer 22. In addition, the servo amplifier 26 outputs a positive voltage corresponding to a displacement value of the slider 22a in a direction $A_1$ when the slider 22a moves in the direction $A_1$ so that the resistor bridge circuit 25 is no longer subjected to the equilibrium state. Similarly, the servo amplifier 26 outputs a negative voltage corresponding to a displacement value in a direction $B_1$ when the slider 22a moves in the direction $B_1$. Furthermore, an output terminal of the servo amplifier 26 is connected to one terminal of the coil 18 the other terminal of which is connected to one terminal of the coil 17. The other terminal of the coil 17 is grounded.

Figure 5:
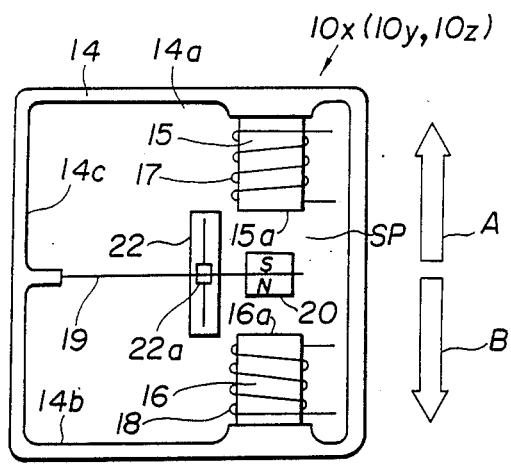
FIG. 5 is a sectional view showing an inner constitution of the acceleration sensor shown in FIG. 4.

When the case 12 housing each of the acceleration sensors $10x$, $10y$ and $10z$ having the above-mentioned mechanical and electric constitutions is moved and accelerated in the direction A shown in FIG. 5, the acceleration of the case 12 causes the permanent magnet 20 to be displaced in the direction B. Due to the displacement of the permanent magnet 20, the slider 22a of the potentiometer 22 is displaced in the direction $B_1$ shown in FIG. 6. Hence, the servo amplifier 26 outputs a negative voltage corresponding to the displacement of the slider 22a. Therefore, an exciting current flows into the servo amplifier 16 via an electric path constituted by a grounding terminal, the coil 17 and the coil 18, whereby tip end portions 15a and 16a of the cores 15 and 16 are both magnetized to the N pole. Thus, a magnetic attraction force is produced between the permanent magnet 20 and the core 15, and a magnetic repulsive force is produced between the permanent magnet 20 and the core 16. As a result, a restoring force acts on the permanent magnet 20 in a direction $A_2$ (shown in FIG. 6) such that the position of the permanent magnet 20 is returned to an original position.

Due to the above restoring force, the permanent magnet 20 is moved in the direction $A_2$. Hence, the slider 22a interlocked with the permanent magnet 20 approaches the middle point of the potentiometer 22 to thereby lower the output voltage of the servo amplifier 26 and the exciting current flowing through the coils 17 and 18. Finally, the permanent magnet 20 is located at a balance point corresponding to an intensity of stress applied to the plate spring 19. On the other hand, when each of the acceleration sensors 10x, 10y and 10z is moved and accelerated in the direction B shown in FIG. 5, the servo amplifier 26 outputs the positive voltage so that an exciting current flows to the ground via the coils 18 and 17 in series. As described before, the permanent magnet 20 is located at another balance point corresponding to the intensity of force applied to the plate spring 19.

As described heretofore, when each of the acceleration sensors 10x, 10y and 10z is moved, the displacement of the permanent magnet 20 is produced under an effect of the force corresponding to the acceleration of the acceleration sensor. Due to the displacement of the permanent magnet 20, the resistor bridge circuit 25 is not subjected to the equilibrium state and the exciting current must flows through the coils 17 and 18. This exciting current generates the restoring force by which the permanent magnet 20 is returned to the original position. Thus, the permanent magnet 20 must normally be located at the balancing point corresponding to the intensity of force applied to the plate spring 19. In this case, the output voltage of the servo amplifier 26 has a polarity corresponding to the moving direction of the acceleration sensor and a value corresponding to the value of the accelerations of the acceleration sensor. Such output voltage of the servo amplifier 26 is outputted via a detection terminal 27. More specifically, the X-direction acceleration sensor 10x outputs a acceleration detecting signal Vx, the Y-direction acceleration sensor 10y outputs a acceleration detecting signal Vy, and the Z-direction acceleration sensor 10z outputs a acceleration detecting signal Vz. Incidentally, the Z-direction acceleration sensor 10z must be set to have a desirable spring constant and a desirable position of the plate spring 19 by which the gravitational effect applied thereto is be eliminated.

Next, description will be given with respect to the constitution of the present embodiment in conjunction with FIG. 2. In FIG. 2, the acceleration detecting signals Vx, Vy and Vz outputted from the acceleration sensors 10x, 10y and 10z are respectively supplied to analog input terminals $AI_1$, $AI_2$ and $AI_3$ of a three-channel analog-to-digital (A/D) converter 30. This A/D converter 30 can handle input signals having both positive and negative polarities. More specifically, the A/D converter 30 outputs acceleration detecting data of eight bits constituted by data of one bit representative of the polarity of the acceleration detecting signal and data of seven bits corresponding to an absolute value of the acceleration detecting signal. Such acceleration detecting data are outputted from a digital output terminal DO of the A/D converter 30.

Meanwhile, 32 designates a central processing unit (CPU) for performing operations and controls (which will be described later), 33 designates a read only memory (ROM) for pre-storing programs which will be executed by the CPU 32, 34 designates a random access memory (RAM) for once storing data, and 35 designates an input/output port (I/O) circuit for transferring data with an external device (not shown). The I/O circuit 35 supplies channel selecting data CS and a start signal STC for an analog-to-digital conversion to the A/D converter 30 based on a certain command of the CPU 32. Thereafter, when the A/D converter 30 supplies the end signal EOC for the analog-to-digital conversion to the I/O circuit 35, the I/O circuit 35 inputs and outputs the acceleration detecting data (outputted from the data output terminal DO of the A/D converter 30) to the CPU 32. Furthermore, an on/off signal (representative of the on/off states of the push button switch 11) is supplied to the CPU 32 via the I/O circuit 35. This I/O circuit 35 provides a serial output terminal SO and a serial clock terminal SCK, whereby parallel data outputted from the CPU 32 are converted to serial data and such serial data are outputted in synchronism with a serial clock signal. Such serial data are supplied to the personal computer system via the cable 13 (shown in FIG. 3). In FIG. 2, 36 designates a pull-up resistor.

Next, description will be given with respect to the present embodiment having the mechanical and electrical constitutions described before. First, the operator holds and swings the case 12 in right and left directions, in forward and backward directions and in upward and downward directions, for example. In this case, the X-direction acceleration sensor 10x outputs the acceleration detecting signal Vx corresponding to the moving accelerations thereof in the right and left directions, the Y-direction accelerator sensor 10y outputs the acceleration detecting signal Vy corresponding to the accelerations thereof in the forward and backward directions, and the Z-direction acceleration sensor 10z outputs the acceleration detecting signal Vz corresponding to the accelerations thereof in the upward and downward directions. Meanwhile, the I/O circuit 35 sequentially outputs the start signal STC and the channel selecting data CS to the A/D converter 30 based on the command of the CPU 32. Hence, the A/D converter 30 sequentially converts the acceleration detecting signals Vx, Vy and Vz (respectively supplied to the analog input terminals $AI_1$, $AI_2$ and $AI_3$) into respective acceleration detecting data, and such speed detecting data are supplied to the I/O circuit 35. The CPU 32 inputs the acceleration detecting data sequentially supplied to the I/O circuit 35, and the CPU 32 sequentially integrates the acceleration detecting data so as to calculate displacement data. More specifically, the CPU 32 sequentially calculates three sets of displacement data respectively for the X, Y and Z directions.

Next, each of the three sets of displacement data in the X, Y and Z directions are supplied to the I/O circuit 35 wherein the three sets of displacement data are outputted from the serial output terminal SO in series. In this case, these displacement data are outputted from the I/O circuit 35 in synchronism with the serial clock signal outputted from the serial clock terminal SCK. In addition, the CPU 32 inputs the on/off signal of the push button switch 11 at a desirable timing. This on/off signal with the displacement data are both outputted from the serial output terminal SO of the I/O circuit 35.

As described heretofore, the present embodiment detects the accelerations respectively in the X, Y and Z directions of the three dimensional rectangular coordinates based on the bottom plane 12a of the case 12. Based on detecting results of the above accelerations, the present embodiment calculates moving distances in the X, Y and Z directions and outputs data representative of such moving distances.

This invention may be practiced or embodied in still other ways without departing from the spirit or essential character thereof. For instance, it is possible to execute an operation for calculating the displacement data based on the acceleration detecting data by the personal computer system, while the present embodiment provides the CPU 32 for executing such operation within the case 12. Additionally, it is possible to only provide the X-direction acceleration sensor 10x and the Y-direction acceleration sensor 10y to thereby obtain the moving distances in the X and Y directions of the two dimensional rectangular coordinates based on the bottom plane 12a of the case 12. Furthermore, it is possible to use any sensors the output voltages of which varies linearly in response to the displacement of the permanent magnet 20, while the present embodiment uses the linear potentiometer 22 as the sensor for detecting the displacement of the permanent magnet 20. For instance, it is possible to use an electrostatic capacitance type displacement sensor applying a principle of a parallel-plate capacitor, an eddy current type displacement sensor for detecting displacement by using an inductance variation of a high-frequency coil, a non-contact type linear potentiometer using a magnetic resistor element and the permanent magnet or any other sensors. Therefore, the preferred embodiment described herein is illustrative and not restrictive, the scope of the invention being indicated by the appended claims and all variations which come within the meaning of the claims are intended to be embraced therein.

What is claimed is:

1. An apparatus for determining distance coordinates along at least two orthogonal axes comprising:
    (a) at least two acceleration detecting means for detecting accelerations along said at least two orthogonal axes, wherein each of said acceleration detecting means detects accelerations along one of said two orthogonal axes and comprises:
        (i) a hollow case;
        (ii) one pair of electromagnets which are respectively attached to mutually opposed inner planes of said hollow case, each of said electromagnets comprising a core wound by a coil, the coil of one electromagnet being wound reverse to that of the other electromagnet, and said coils being connected in series;
        (iii) a permanent magnet movable between said electromagnets;
        (iv) means for outputting an output voltage which is varied in response to movements of said permanent magnet, said permanent magnet moving nearer to one of said electromagnets and further apart from the other of said electromagnets when the acceleration detecting means is moved in acceleration;
        (v) means for producing an output current having a direction and an amplitude corresponding respectively to the direction and magnitude of the acceleration of the acceleration detecting means, said output current flowing through said coils in series so as to magnetize said electromagnets in response to accelerations of the acceleration detecting means, said permanent magnet being located at a balanced position under a magnetic field produced between said electromagnets, said output current comprising the output acceleration signal of the acceleration detecting means; and
    (b) operating means for calculating the distance coordinates along said at least two orthogonal axes based on the output acceleration signal of each of said acceleration detecting means.

2. An apparatus for determining distance coordinates for a computer system, said coordinates representing a position of a cursor on a screen of a display unit of said computer system, said apparatus comprising:
    (a) at least two acceleration detecting means for detecting accelerations thereof along at least two orthogonal axes of a rectangular reference coordinate system, each of said acceleration detecting means producing an output acceleration signal representative of detected accelerations along one of said at least two orthogonal axes, wherein each of said acceleration detecting means comprises:
        (i) a hollow case;
        (ii) one pair of electromagnets which are respectively attached to mutually opposed inner planes of said hollow case, each of said electromagnets comprising a core wound by a coil, the coil of one electromagnet being wound reverse to that of the other electromgnet, and said coils being connected in series;
        (iii) a permanent magnet movable between said electromagnets;
        (iv) means for outputting an output voltage which is varied in response to movements of said permanent magnet, said permanent magnet moving nearer to one of said electromagnets and further apart from the other of said electromagnets when the acceleration detecting means is moved in acceleration; and
        (v) means for producing an output current having a direction and an amplitude corresponding respectively to the direction and magnitude of the acceleration of the acceleration detecting means, said output current flowing through said coils in series so as to magnetize said electromagnets in response to accelerations of the acceleration detecting means, said permanent magnet being located at a balanced position under a magnetic field produced between said electromagnets, said output current comprising the output acceleration signal of the acceleration detecting means;
    (b) analog-to-digital converter means for respectively converting said at least two output acceleration signals to at least two sets of digital acceleration data; and
    (c) operating means for calculating the distance coordinates along said at least two orthogonal axes based on said at least two sets of digital acceleration data.

* * * * *